(12) United States Patent
Frye et al.

(10) Patent No.: US 9,293,277 B2
(45) Date of Patent: Mar. 22, 2016

(54) RFID ACTUATED BREAKER CODING INTERLOCK

(71) Applicant: EATON CORPORATION, Cleveland, OH (US)

(72) Inventors: Richard Blaine Frye, Aliquippa, PA (US); Zachary Ryan Jenkins, Pittsburgh, PA (US); Anthony Thomas Ricciuti, Bethel Park, PA (US)

(73) Assignee: EATON CORPORATION, Cleveland, OH (US)

( * ) Notice: Subject to any disclaimer, the term of this patent is extended or adjusted under 35 U.S.C. 154(b) by 35 days.

(21) Appl. No.: 14/265,457

(22) Filed: Apr. 30, 2014

(65) Prior Publication Data

US 2015/0318122 A1 Nov. 5, 2015

(51) Int. Cl.
*G06K 5/00* (2006.01)
*H01H 9/08* (2006.01)
*H02B 1/04* (2006.01)

(52) U.S. Cl.
CPC ... *H01H 9/08* (2013.01); *H02B 1/04* (2013.01)

(58) Field of Classification Search
CPC .. G07F 7/1008; G06Q 20/341; G06Q 10/087; G06Q 10/08; G06K 17/00; G06K 7/10693; B42D 15/10
USPC .............................. 235/382, 462.13, 487, 385
See application file for complete search history.

(56) References Cited

U.S. PATENT DOCUMENTS

2013/0008068 A1* 1/2013 Kolton et al. ................... 40/672
2014/0138440 A1* 5/2014 D'Ambrosio et al. ........ 235/385

* cited by examiner

*Primary Examiner* — Karl D Frech
(74) *Attorney, Agent, or Firm* — Eckert Seamans Cherin & Mellott, LLC; Carol A. Marmo; Grant E. Coffield

(57) ABSTRACT

The disclosed concept pertains to systems and methods to control the passing or entering of a circuit breaker into a cell. The concept relates to employing a RFID-actuated circuit breaker coding interlock. The interlock includes a circuit breaker having a RFID tag that stores information relating to the circuit breaker and a cell structured to receive the circuit breaker. The cell includes a blocking mechanism moveable between a blocking condition which prevents insertion of the circuit breaker into the cell and a non-blocking condition which permits insertion of the circuit breaker into the cell, and an RFID reader module structured to wirelessly receive the information from the RFID tag and determine whether to move the blocking mechanism from the blocking condition to the non-blocking condition based on the information.

14 Claims, 10 Drawing Sheets

RFID ACTUATED BREAKER CODING INTERLOCK

BACKGROUND

1. Field

The disclosed concept pertains generally to circuit breakers, switchgear compartments, and interlocks. In particular, the disclosed concept pertains to radio frequency identifier-actuated circuit breaker coding interlocks.

2. Background Information

Circuit breakers provide a means for controlling a supply of electrical power to a circuit. A trip unit, such as an electronic trip unit control module, is commonly used to interface with the breaker to control tripping characteristics, including the rate of tripping and the trip current. Trip units may be removable from the breaker for servicing and for replacement by trip units having alternate tripping characteristics.

Circuit interrupters, such as for example and without limitation, circuit breakers, are typically used to protect electrical circuitry and people in the vicinity of electrical circuitry from damage due to an overcurrent condition, such as an overload condition, a short circuit, or another fault condition, such as an arc fault or a ground fault. Circuit breakers typically include separable contacts. The separable contacts may be operated either manually by way of an operator handle or automatically in response to a detected fault condition. Typically, such circuit breakers include an operating mechanism, which is designed to rapidly open and close the separable contacts, and a trip mechanism, such as a trip unit, which senses multiple potential fault conditions to trip the breaker automatically. Upon sensing a fault condition, the trip unit trips the operating mechanism to a trip state, which moves the separable contacts to their open position.

Fault conditions in circuit breakers are generally detected either by sensing the current flowing through the protected circuit or by sensing the temperature of conductors in the circuit breaker. Circuit breakers generally employ a mechanism such as an electronic trip unit or a magnetic trip unit to initiate a trip operation based on the current flowing through the protected circuit. Trip operations initiated by an electronic trip unit or magnetic trip unit are usually either instantaneous or initiated after a predetermined delay.

The intent of using a breaker coding interlock system is safety. It is imperative for ratings such as voltage, continuous current, and number of cycles, that the breaker can be interlocked in such a way that a breaker of a lower rating may not be inserted into a switchgear compartment with a higher rating, but that a breaker of a higher rating may be inserted and used in a switchgear compartment with a lower rating in certain instances.

FIG. 1 is a front view showing a circuit breaker 10 and cell 12, in accordance with the prior art. The circuit breaker 10 includes wheels 13 and a plurality of breaker code pins 14 attached to a surface 15 of the circuit breaker 10 and protruding outwardly and downwardly therefrom. The cell 12 includes a plurality of cell code pins 16 attached to a surface 17 of the cell 12 and protruding outwardly and upwardly therefrom.

FIG. 2 is a partial side view of the circuit breaker 10 and the cell 12, as shown in FIG. 1. The arrow indicates that the circuit breaker 10 enters or passes into the cell 12. The cell code pins 16 and corresponding surface 17 are positioned on the bottom surface of the cell 12.

FIG. 3 is a partial side view of the circuit breaker 10 passed into the cell 12. The breaker code pins 14 are shown in alignment with the cell code pins 16.

FIG. 4 is a detailed view of the breaker code pins 14 and the cell code pins 16 shown in FIG. 1. FIG. 4 shows the breaker code pins 14 and the cell code pins 16 in an alignment such that the breaker codes pins 14 and the cell code pins 16 do not interfere with each other as the circuit breaker 10 is allowed to pass or enter into the cell 12.

FIG. 5 is also a detailed view of the breaker code pins 14 and the cell code pins 16 shown in FIG. 1. FIG. 5 shows the breaker code pins 14 and the cell code pins 16 in an alignment such that there is interference between these pins 14,16 when it is attempted to pass or enter the circuit breaker 10 into the cell 12. The circuit breaker 10 is precluded from entering the cell 12 beyond the code pins 14,16.

It is known to use a torsional interference pin system having ten locations with three levels of variation to account for the variations that require coding to implement the interlocking system shown in FIGS. 1-5. The three levels of variation can be coded as 0 for no pin, 1 for short pin and 2 for long pin.

Radio Frequency (RF) devices are quite popular in many applications such as Radio Frequency Identification (RFID) systems and remote sensing. For example, RFID systems consist of one or more radio frequency tags or transponders (RFID tags) and one or more radio frequency readers or interrogators (RFID readers). The RFID tags typically include an integrated circuit (IC) chip, such as a complementary metal oxide semiconductor (CMOS) chip, and an antenna connected thereto for allowing the RFID tag to communicate with an RFID reader over an air interface by way of RF signals. In a typical RFID system, one or more RFID readers query the RFID tags for information stored on them, which can be, for example, identification numbers, user written data, or sensed data. RFID systems have thus been applied in many application areas to track, monitor, and manage items as they move between physical locations.

Radio frequency identification (RFID) tags are used in a variety of applications, such as inventory control and security. Unlike barcode tracking systems, the advantage of these more intelligent RFID systems is that an RFID system can store specific information about an article and can read that information on a tag without being directly connected to the tag as well as without requiring line of sight or a particular orientation. This means that RFID systems can be largely automated, reducing the need for manual scanning RFID tags are typically placed on, or in, articles or containers. The RFID tags work in conjunction with an RFID base station. The base station supplies an electromagnetic wave output, which acts as the carrier frequency. Data is then used to modulate the carrier frequency to transmit specific information. RFID systems typically operate at either a low frequency range (generally less than 100 MHz), or a higher frequency range (greater than 100 MHz). In many applications, one such higher frequency range is between 800 and 1000 MHz (defined as the UHF Band), with 915 MHz being the most common high frequency currently utilized in the United States. Most RFID systems utilize frequency hopping centered around this frequency, such that the overall frequency range is approximately 902 to 928 MHz. A second high frequency used by RFID tags in the United States is 2450 MHz.

Many RFID tags contain integrated circuits, which are capable of storing information. Depending on the specific implementation of the RFID tag, the integrated circuit may be capable of replacing stored information with new information at a later time. When the base station requests data, the integrated circuit supplies the information that it has stored in response to that request. In those RFID tags that permit information to be rewritten, the integrated circuit overwrites its existing information when new data is received from the base station.

In addition to the integrated circuit, the RFID tags contain an antenna. The antenna is needed to receive the electromagnetic waves generated by the base station, and to transmit data via the same frequency. The configuration of the antenna can vary, and includes flat coils, patches, micro-strip antennas, strip-line antennas and dipoles.

RFID tags may be self-powered and contain an internal power supply such as a battery. Other RFID tags are field-powered, meaning that radio frequency energy is received by the tag antenna as an AC signal and rectified to form a DC voltage that is used to power the integrated circuit.

Thus, it is an object of the disclosed concept to develop RFID-actuated coding interlocks for use in circuit breakers to assure that a circuit breaker having an unacceptable identity, e.g., voltage or current rating, is blocked from passing or entering a switchgear compartment.

SUMMARY

These needs and others are met by embodiments of the disclosed concept, which provide systems and methods for RFID-actuated circuit breaker interlocks.

In an aspect, the disclosed concept provides a circuit breaker interlock system which includes a circuit breaker, the circuit breaker having a RFID tag storing first information relating to an operational characteristic of the circuit breaker, and a cell structured to receive the circuit breaker. The cell includes a blocking mechanism moveable between a blocking condition which prevents insertion of the circuit breaker into the cell and a non-blocking condition which permits insertion of the circuit breaker into the cell, and an RFID reader module structured to wirelessly receive the first information from the RFID tag and determine whether to move the blocking mechanism from the blocking condition to the non-blocking condition based on the first information.

In certain embodiments, the blocking mechanism includes a relay which opens for the blocking condition and closes for the non-blocking condition. Further, the blocking mechanism can include a pin mechanism structured to retract for the non-blocking condition to permit the circuit breaker to be inserted into the cell beyond the pin mechanism, and the pin mechanism can be structured to be un-retracted for the blocking condition to prevent the circuit breaker from being inserted into the cell beyond the pin mechanism. The pin mechanism can be a single pin.

The first information can relate to an operational characteristic selected from voltage, continuous current, number of cycles and combinations thereof The RFID reader module can be structured to store second information relating to an operational characteristic of the cell. The second information can relate to an operational characteristic selected from voltage, continuous current, number of cycles and combinations thereof. The RFID reader module can be structured to compare the first information relating to the operational characteristic of the circuit breaker with the second information relating to the operational characteristic of the cell and determine whether to move the blocking mechanism from the blocking condition to the non-blocking condition based on the comparison of the first information with the second information.

In certain embodiments, the operational characteristic of the circuit breaker and the operational characteristic of the cell each can be continuous current.

The non-blocking condition can correspond to the continuous current of the circuit breaker being greater than or equal to the continuous current of the cell. The blocking condition can correspond to the continuous current of the circuit breaker being less than the continuous current of the cell.

In certain embodiments, the cell is a switchgear compartment.

In another aspect, the disclosed concept provides a method to control inserting a circuit breaker into a cell. The method includes obtaining a circuit breaker, the circuit breaker having a RFID tag, storing in the RFID tag first information relating to an operational characteristic of the circuit breaker, obtaining a cell structured to receive the circuit breaker, connecting a blocking mechanism to the cell, moving the blocking mechanism between a blocking condition to prevent insertion of the circuit breaker into the cell and a non-blocking condition to permit insertion of the circuit breaker into the cell, employing a RFID reader module structured to wirelessly receive the first information from the RFID tag, receiving the first information from the RFID tag, determining if insertion of the circuit breaker into the cell is to be permitted or prevented based on the first information, moving the blocking mechanism into a blocking condition if insertion of the circuit breaker into the cell is to be prevented, and moving the blocking mechanism into a non-blocking condition if insertion of the circuit breaker into the cell is to be permitted.

In certain embodiments, the method also includes comparing the first information relating to the operational characteristic of the circuit breaker with second information relating to an operational characteristic of the cell; and determining whether to move the blocking mechanism from the blocking condition to the non-blocking condition based on the comparison of the first information with the second information. the disclosed concept provides a system to control passing of a circuit breaker into a cell.

BRIEF DESCRIPTION OF DRAWINGS

A full understanding of the disclosed concept can be gained from the following description of the preferred embodiments when read in conjunction with the accompanying drawings in which.

DETAILED DESCRIPTION OF PREFERRED EMBODIMENTS

Figure 1:
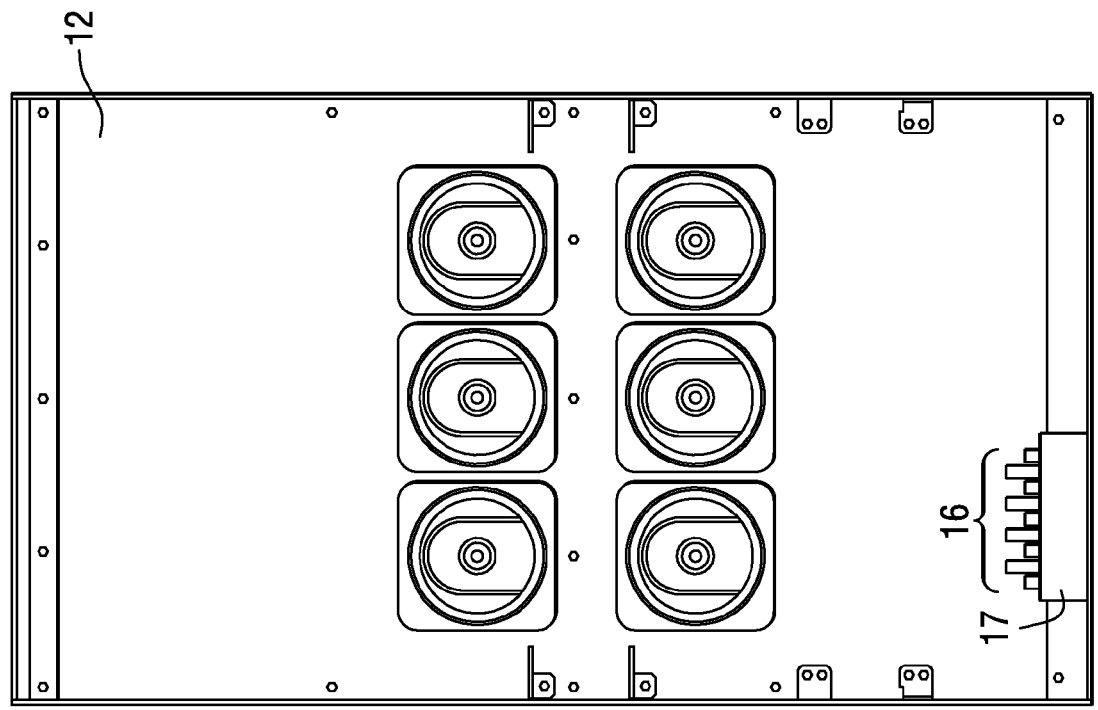
FIG. 1 is a front view of a circuit breaker and cell, in accordance with the prior art.
Figure 1:
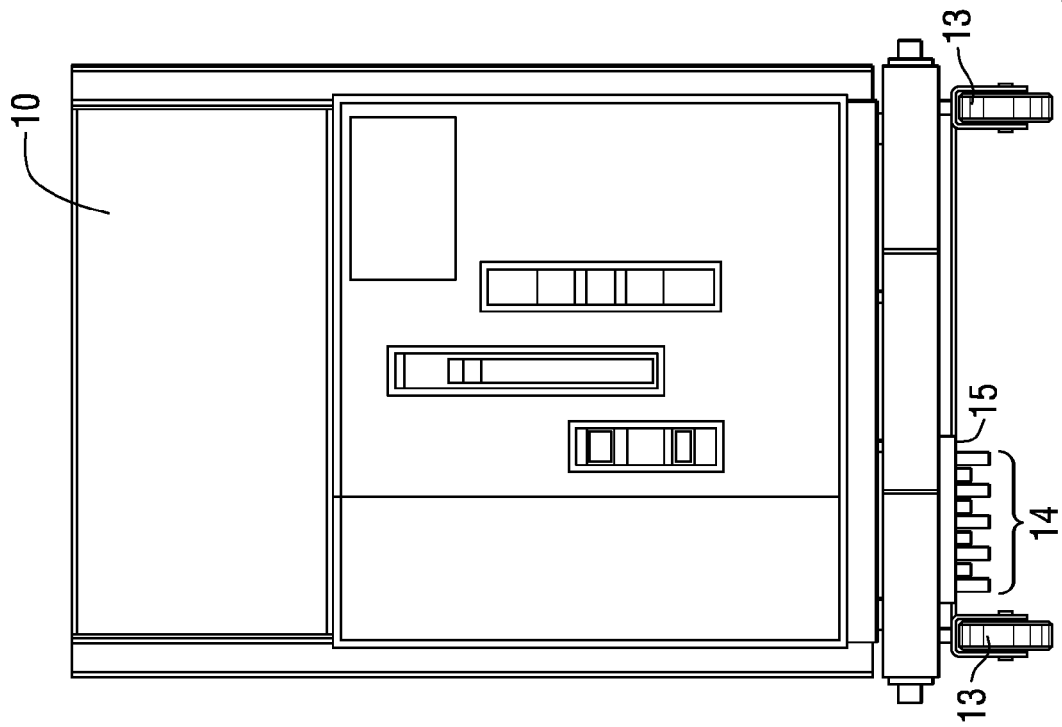
Figure 2:
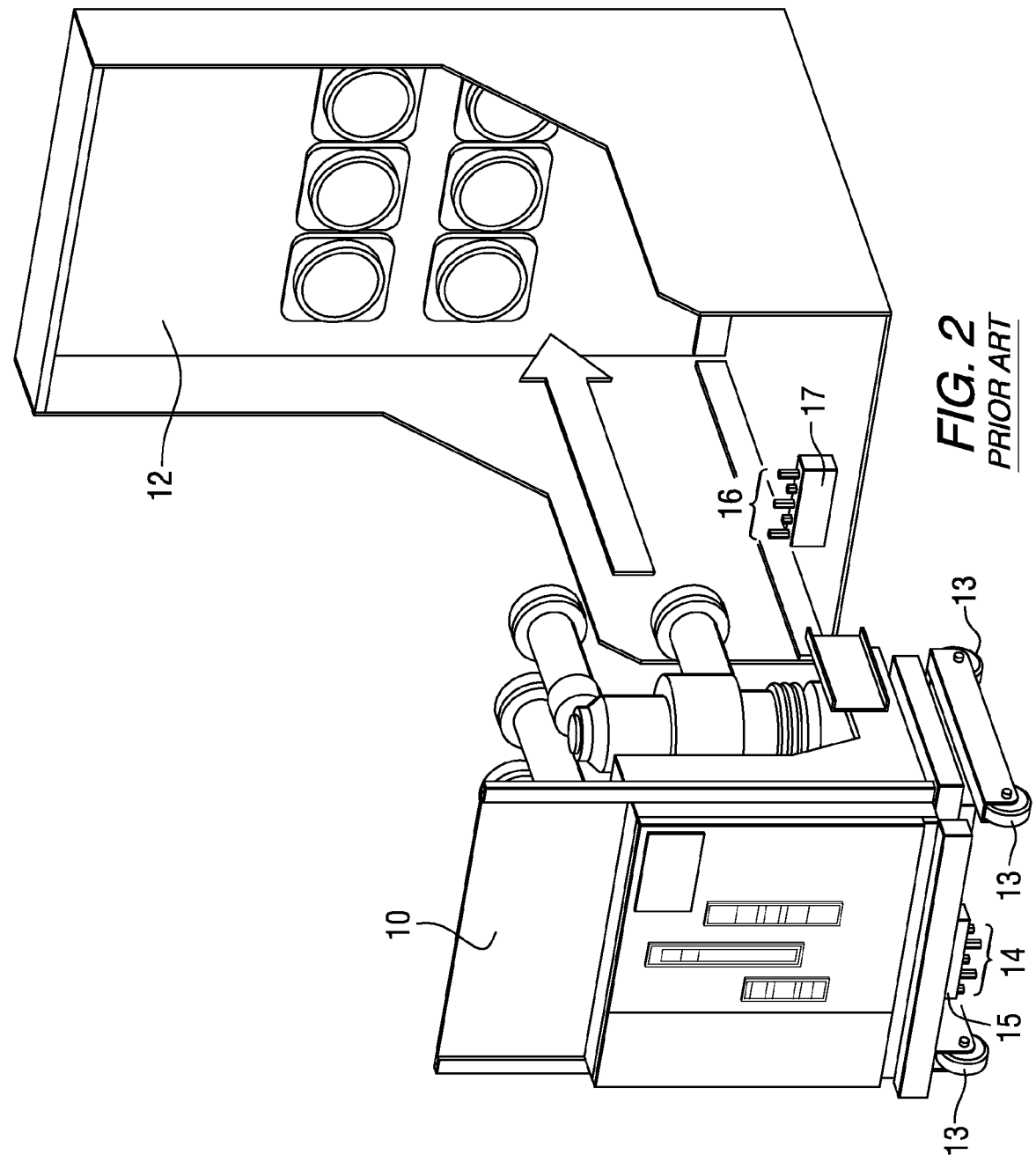
FIG. 2 is a partial side view of the circuit breaker and cell as shown in FIG. 1, in accordance with the prior art.
Figure 3:
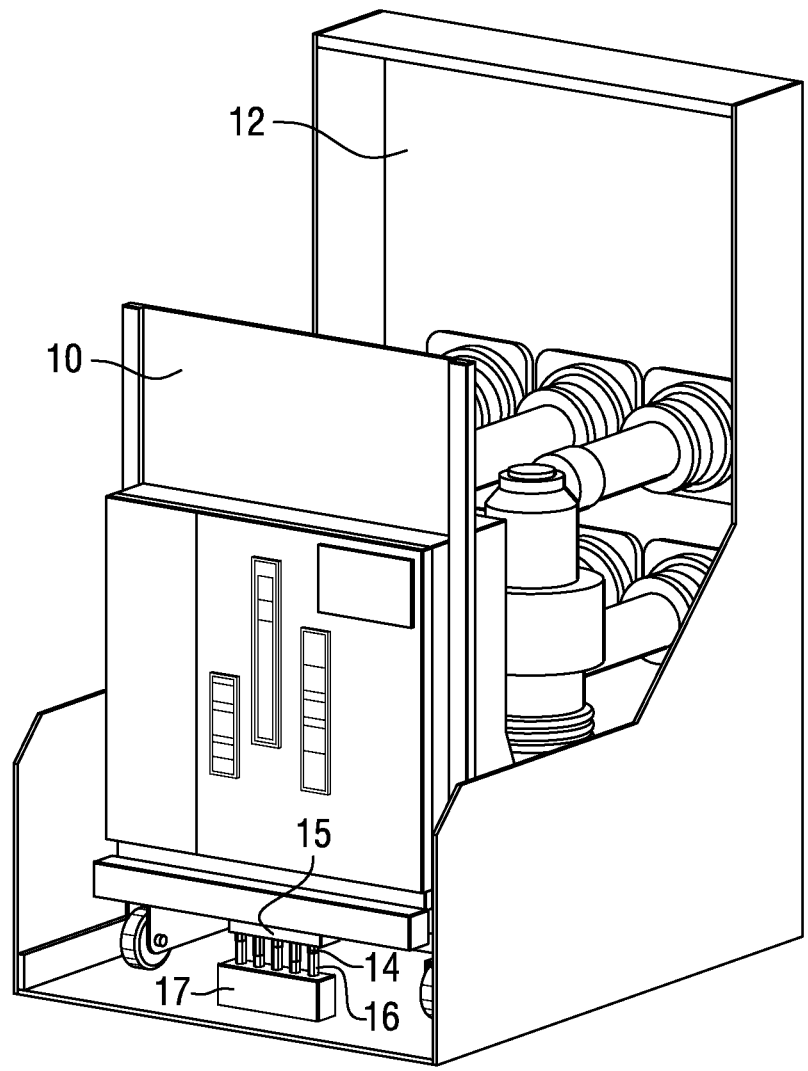
FIG. 3 is a partial side view of the circuit breaker passed into the cell as shown in FIG. 1, in accordance with the prior art.
Figure 4:
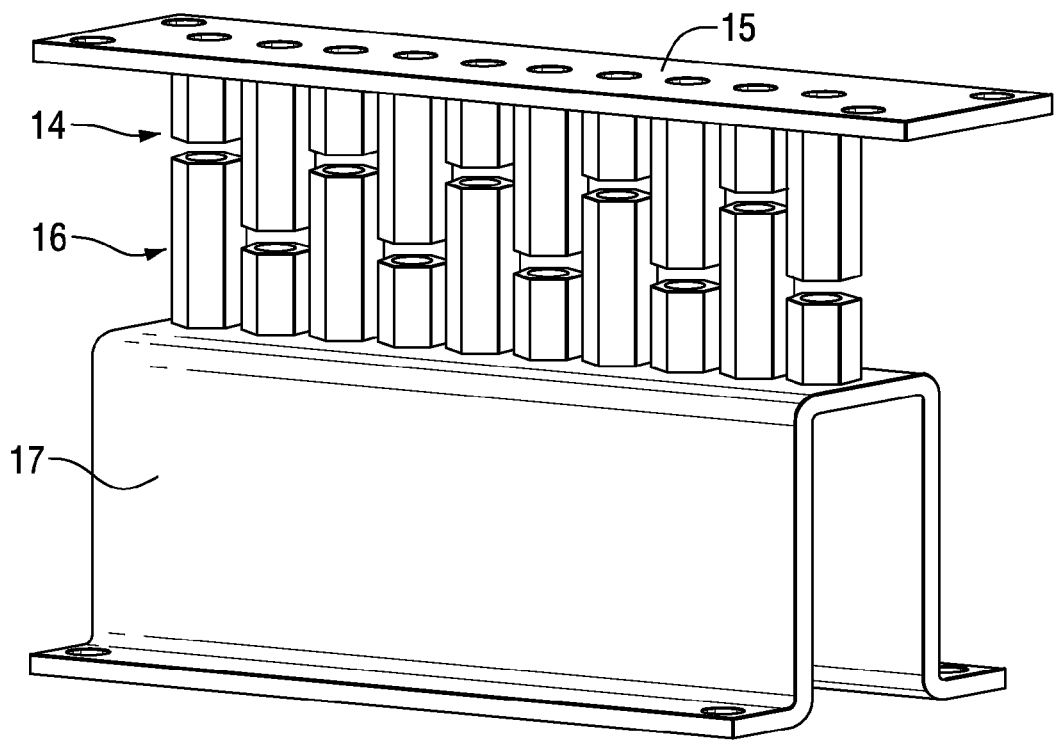
FIG. 4 is a detailed view of the breaker and cell code pins shown in FIG. 1 wherein the pins are in a non-interfering alignment, in accordance with the prior art.
Figure 5:
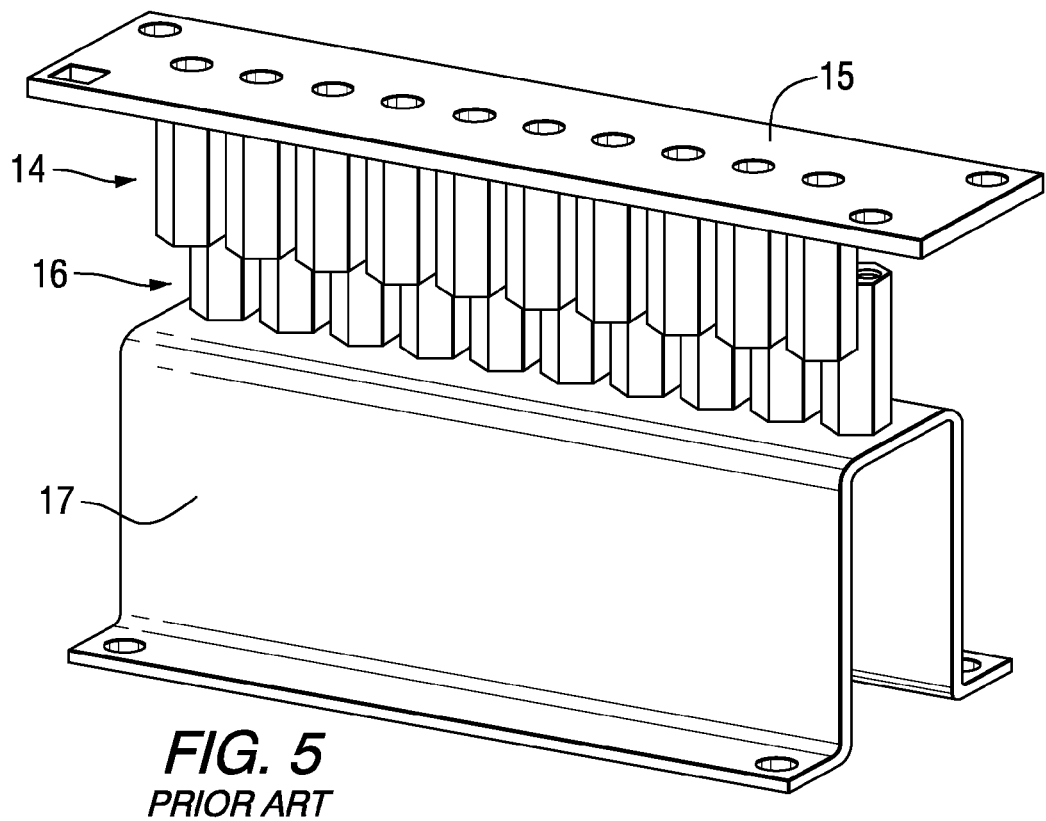
FIG. 5 is a detailed view of the breaker and cell code pins shown in FIG. 1 wherein the pins are in an interfering alignment, in accordance with the prior art.

The disclosed concept relates to a radio frequency identification (RFID) system for use as a circuit breaker coding interlock. The RFID interlock is operable to assure that a circuit breaker of a lower rating may not enter, pass or be accepted or inserted into a cell, such as a switchgear compartment, that has a higher rating and to allow a circuit breaker of a higher rating to enter, pass or be accepted or inserted into the cell, such as the switchgear compartment, with a lower rating in some instances. For example, in accordance with the disclosed concept, the RFID interlock does not permit a circuit breaker with a 1200 amp continuous current rating to enter or pass or be accepted or inserted into a switchgear compartment rated for 2000 amp; however, a circuit breaker with a 1200 amp continuous current rating is allowed to enter or pass or be accepted or inserted into a switchgear compartment that is rated for 630 amps. An RFID interlock is positioned on a surface of the circuit breaker that requires no power, and that has a code corresponding to the circuit breaker which is received and evaluated by a cell to determine whether the breaker is allowed to pass into the cell or if the breaker will be blocked from entering the cell. If the circuit breaker is allowed to pass into the cell, a relay is closed and a signal is sent to open a blocking mechanism, e.g., a pin mechanism.

The RFID interlock includes a tag and an antenna. The RFID tag is typically attached to a surface of the circuit breaker and the antenna is typically attached to a surface of the switchgear compartment. The RFID tag stores information that relates to an operational characteristic, e.g., identity or rating, of the circuit breaker. The operational characteristic can include voltage, continuous current, number of cycles and other information that relates to the circuit breaker. The cell also has information that relates to its operational characteristics, e.g., identity or rating. The operational characteristics of the cell can also include voltage, continuous current, number of cycles and other information. Additionally, the RFID interlock includes a CPU, e.g., controller. The information that relates to the operational characteristics of the cell is stored within the CPU. The CPU is operable to receive the circuit breaker information from the RFID tag and to evaluate or compare the information/operational characteristics, e.g., identity or rating, of the circuit breaker with the information/operational characteristics, e.g., identity or rating, of the cell. Based on the information received, read and evaluated by the CPU, a determination is made as to whether the circuit breaker is permitted to be inserted or passed into the cell. For example, if the result is "acceptable", e.g., the identity or rating of the circuit breaker is greater than or equal to the value of the identity or rating of the cell, a pass or non-blocked condition is determined. In certain embodiments, if a pass or non-blocked condition is determined, a relay closes and sends a signal to open a blocking mechanism, e.g., pin mechanism, to permit the circuit breaker to pass into the cell. If, however, the result is "unacceptable", e.g., the value of the identity or rating of the circuit breaker is less than the value of the identity or rating of the cell, a blocking condition is determined. In certain embodiments, if a blocking condition is determined, the blocking mechanism, e.g., pin mechanism, remains stationary and does not permit the circuit breaker to pass into the cell.

The RFID tag can include a multi-digit code, such as a 10-digit hexadecimal code, which provides a significant number of combinations of coding and an ability to utilize logic in the coding. An example of the coding is as follows. For a circuit breaker rated for 3000 amps, the first two digits of the RFID code is 3 0. For a circuit breaker rated for 2000 amps, the first two digits of the RFID code is 2 0. For a circuit breaker rated for 1600 amps the first two digits is 1 6. For a switchgear compartment designed to only accept 2000 amps and above, and evaluation of the appropriate characters is "first two characters"=>20. Thus, there is a pass or non-blocked condition for each of the breakers rated for 2000 amps and 3000 amps. As indicated, a pass or non-blocked condition results in a relay closing which sends an electrical signal to open a pin mechanism which permits the circuit breaker to pass or enter into the cell. In certain embodiments, the pin mechanism is a single point pin mechanism.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

Figure 6:
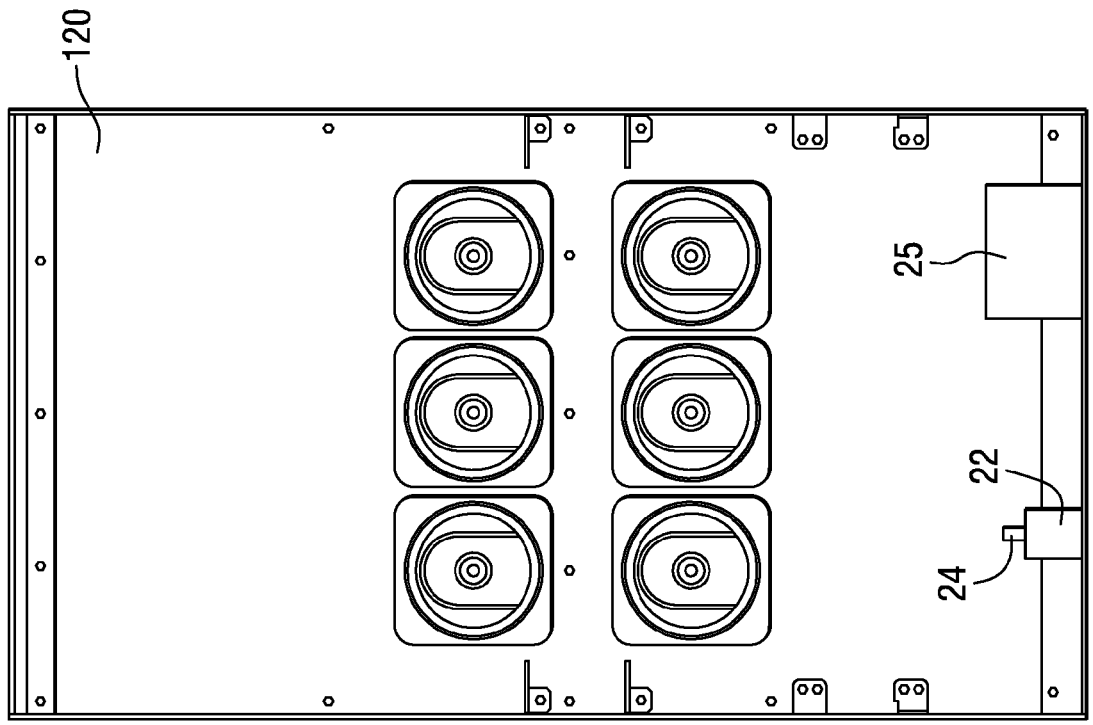
FIG. 6 is a front view of a circuit breaker and cell, in accordance with certain embodiments of the disclosed concept.
Figure 6:
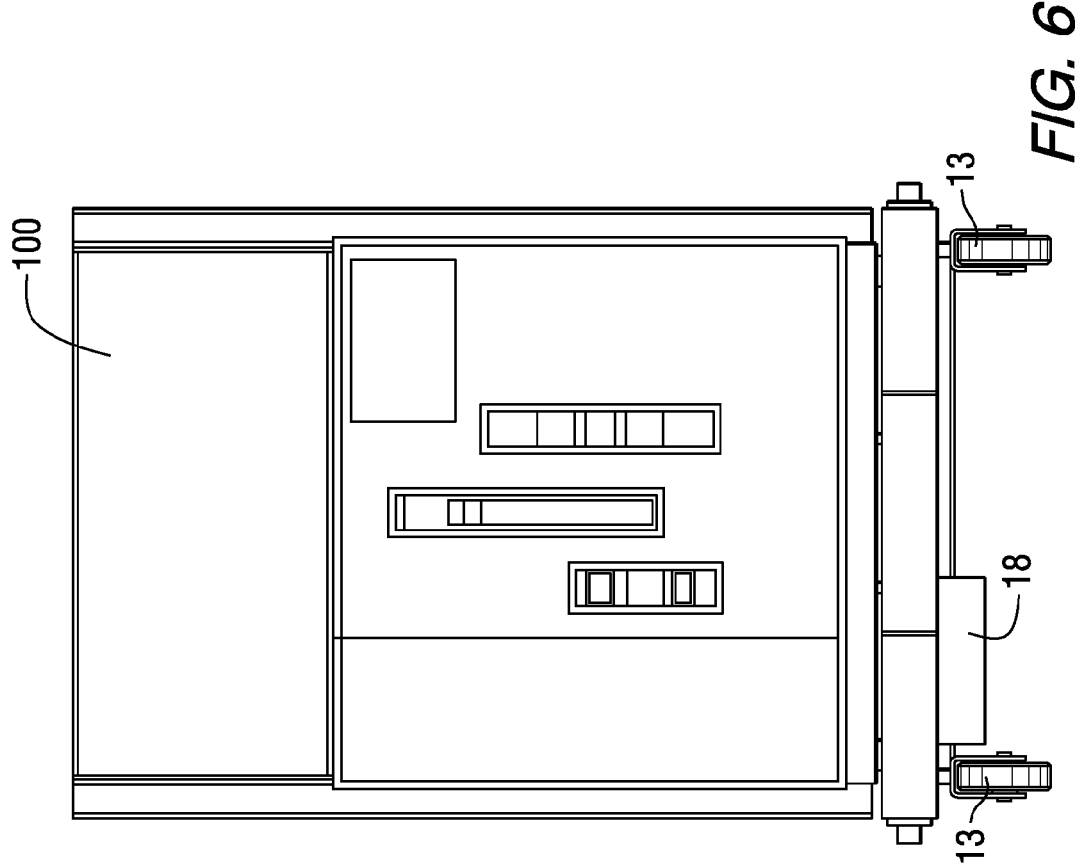

FIG. 6 shows a circuit breaker 100 and a cell 120, in accordance with certain embodiments of the disclosed concept. FIG. 6 further shows a number of wheels, a RFID tag 18, a RFID reader module 25, an under voltage relay (UVR) 22 and a single code pin 24. The circuit breaker 100 can include a wide variety of circuit breakers known in the art, and in particular, includes VCPW-HD circuit breakers manufactured by Eaton Corporation, Pittsburgh, Pa. The number of wheels 13 is coupled to the circuit breaker 100 to facilitate its movement. The RFID tag 18 is coupled to a surface of the circuit breaker 100. The RFID reader module 25, UVR 22 and code pin 24 are coupled to the cell 120. As shown in FIG. 6, the UVR 22 and code pin 24 are coupled to a bottom surface, e.g., floor, of the cell 120. The code pin 24 consists of a single pin mechanism. It is contemplated that the RFID reader module 25 may be adjacent to the cell or may be located in proximity to the cell. The RFID tag 18 includes a code (not shown) representative of the identity or rating of the circuit breaker 100, e.g., voltage or continuous current. The RFID reader module 25 receives the identity code from the RFID tag 18 and evaluates and/or compares the RFID identity code of the circuit breaker 100 with the identity or rating of the cell 120. If the result is "acceptable", the UVR 22 is actuated to retract the code pin 24, e.g., open, to allow the circuit breaker 100 to pass or enter into the cell 120. If the result is "unacceptable", power is not provided to the UVR 22, the code pin 24 remains stationary and does not retract. The circuit breaker 100 is blocked from passing or entering the cell 120 beyond the code pin 24.

An "acceptable" result indicates that the identity or rating, e.g., voltage or current, of the circuit breaker is not less or lower than the identity or rating of the cell 120. In certain embodiments, an "acceptable" result indicates that the identity of rating, e.g., voltage or current, of the circuit breaker is greater or higher than the identity or rating of the cell 120.

Figure 7:
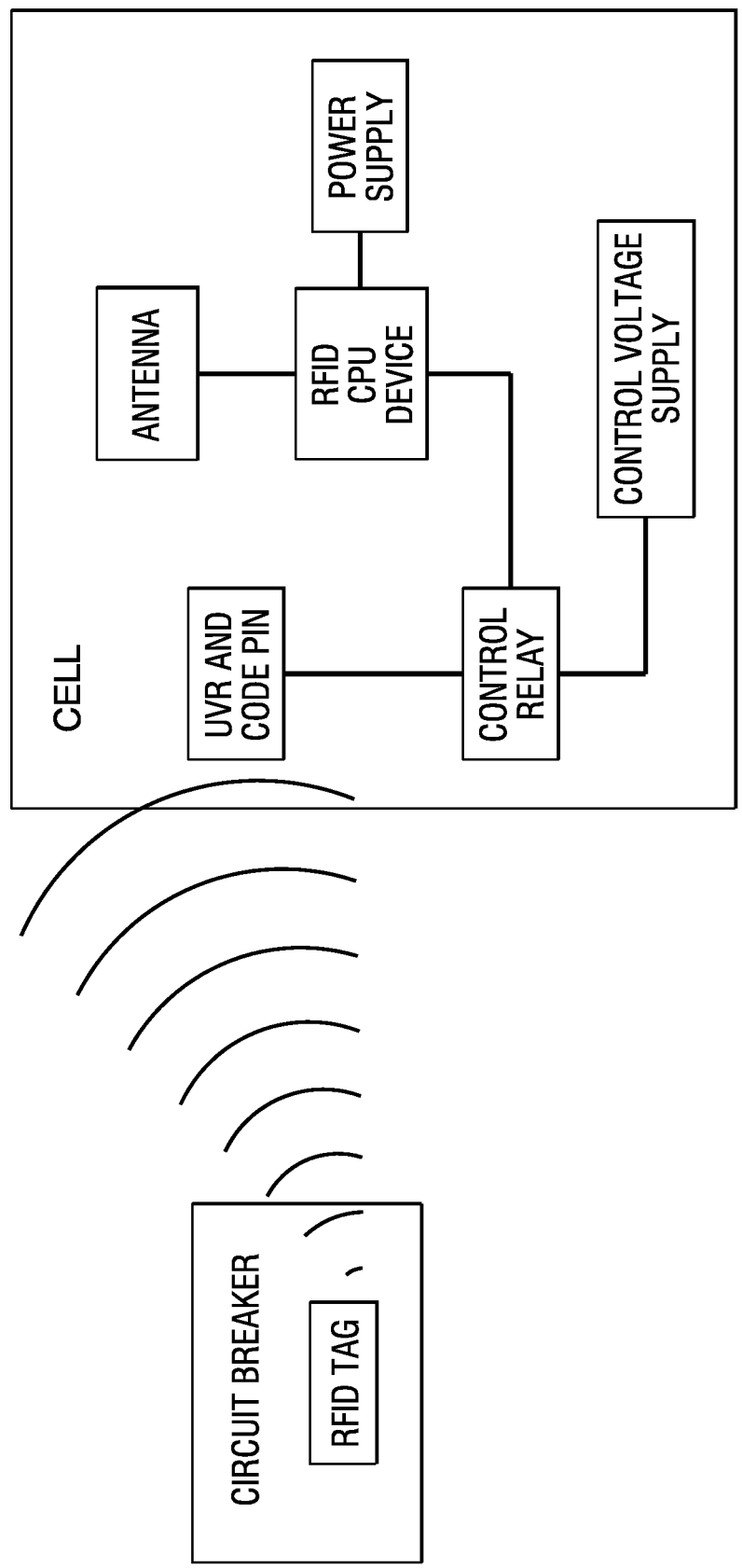
FIG. 7 is a block diagram showing a detailed view of the RFID reader module shown in FIG. 6, in accordance with certain embodiments of the disclosed concept.

FIG. 7 is a block diagram showing a detailed view of the RFID reader module 25, as shown in FIG. 6. As previously described herein and as shown in FIG. 7, code signals from the RFID tag 18 of the circuit breaker 100 are wirelessly transmitted to the cell 120 and received by the RFID reader module 25. The RFID reader module 25 includes an antenna and power supply connected to a RFID central processing unit (CPU) device. Further, a control relay is connected to the RFID CPU device and the UVR 22 and code pin 24. A control voltage supply is connected to the control relay. A pass or non-blocked condition results in the control relay closing which sends an electrical signal to open the code pin 24 which permits the circuit breaker 100 to pass or enter into the cell 120.

Figure 8:
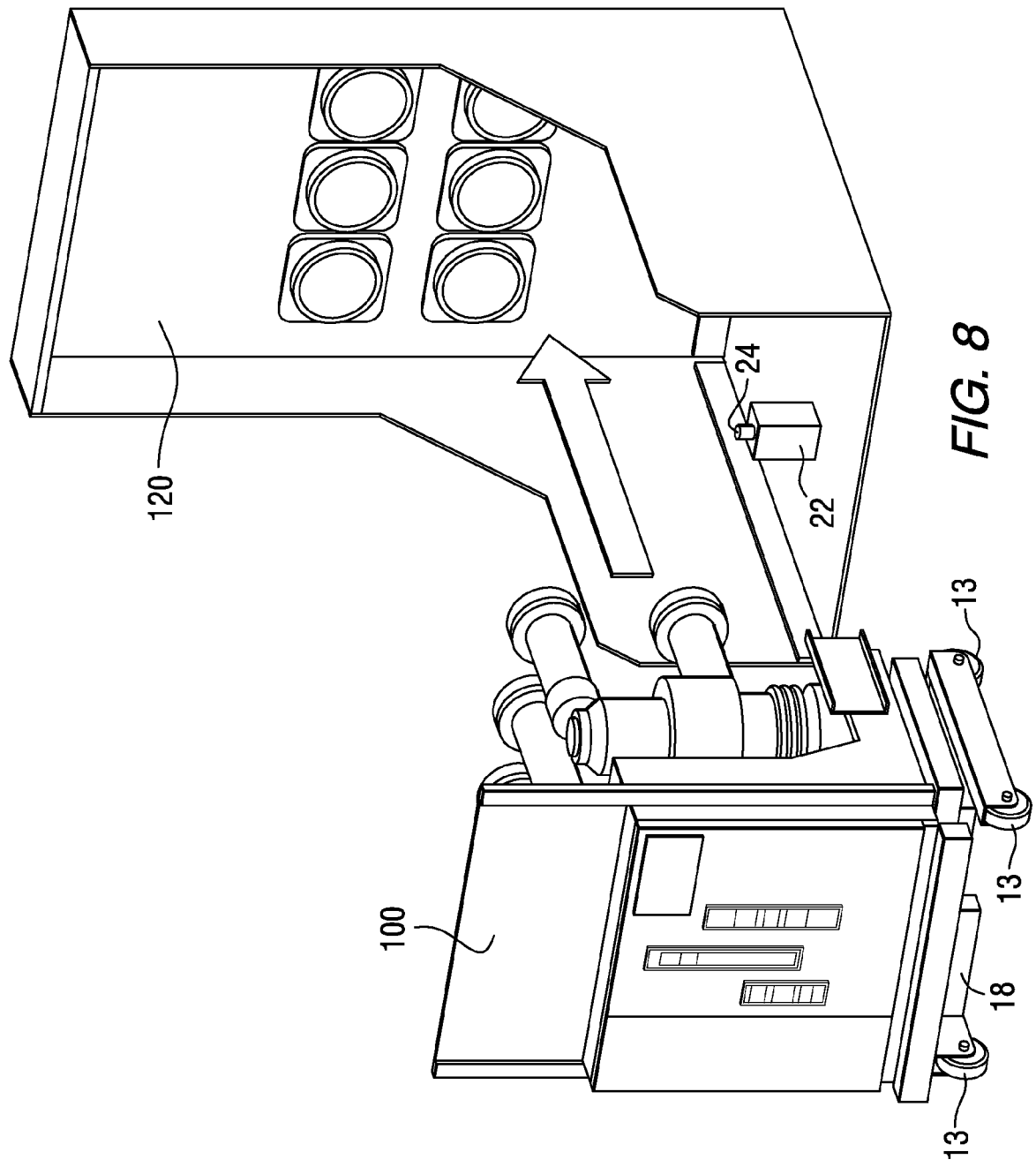
FIG. 8 is a partial side view of the circuit breaker and cell as shown in FIG. 6, in accordance with certain embodiments of the disclosed concept.

FIG. 8 is a partial side view of the circuit breaker 100 and the cell 120, as shown in FIG. 6. The arrow indicates that the circuit breaker 100 enters or passes into the cell 120. The single code pin 24 and UVR 22 are shown positioned on the bottom surface of the cell 120.

Figure 9:
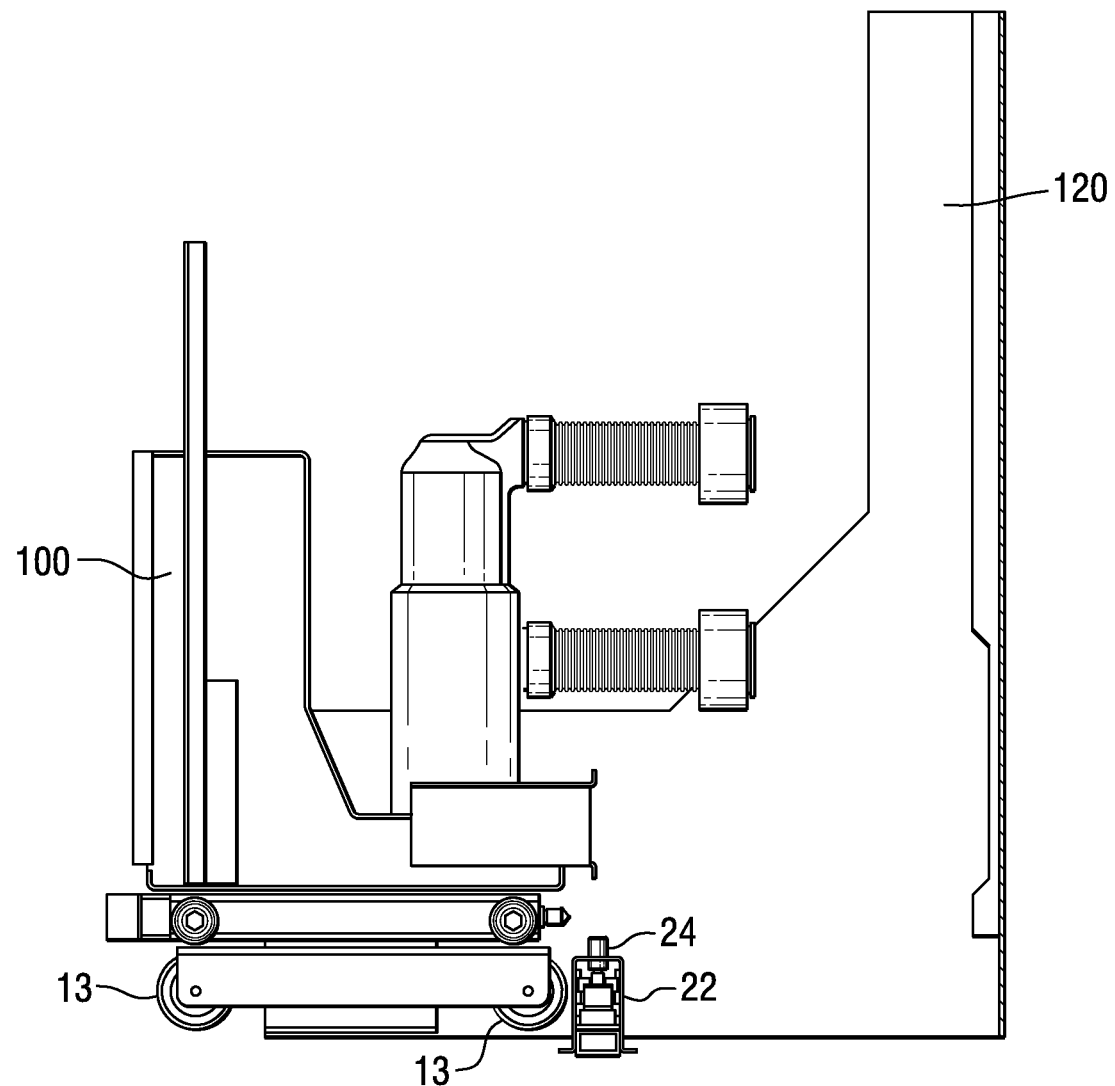
FIG. 9 is a side view of the circuit breaker passed into the cell as shown in FIG. 6, in accordance with certain embodiments of the disclosed concept.

FIG. 9 is a side view of the circuit breaker 100 and the cell 120, as shown in FIG. 6. In FIG. 9, the single code pin 24 is shown in an un-retracted position such that the circuit breaker 100 is not permitted to, e.g., blocked from, entering and being accepted within the cell 120 beyond the single code pin 24.

Figure 10:
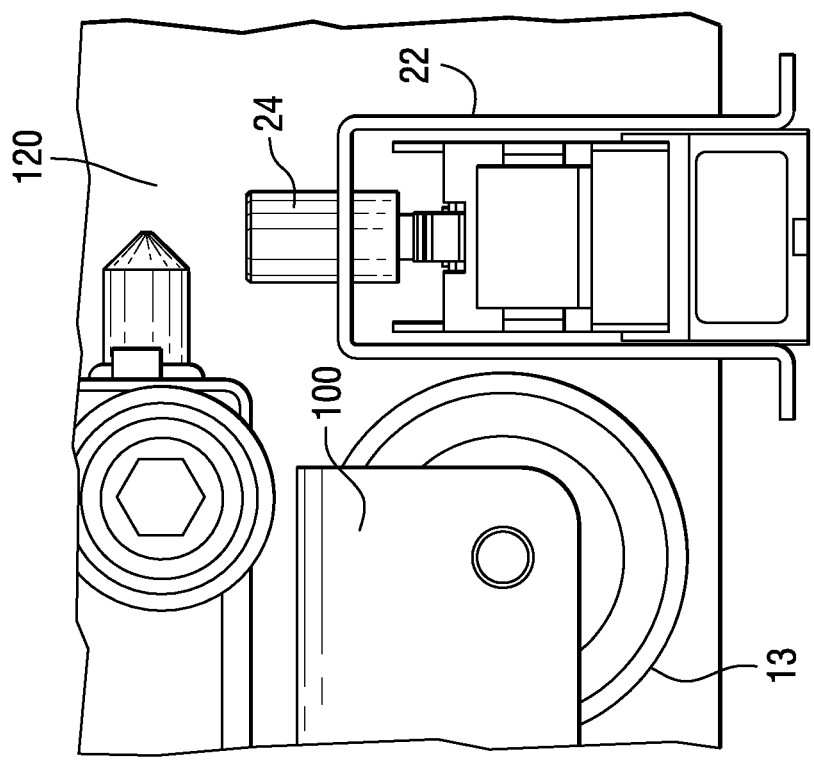
FIG. 10 is a detailed view of FIG. 9 showing the single cell pin un-retracted, in accordance with certain embodiments of the disclosed concept.

FIG. 10 is a detailed view of the single code pin 24 and circuit breaker 100, as shown in FIG. 9. FIG. 10 shows the code pin 24 in an un-retracted, e.g., blocked position, and the circuit breaker 100 is not allowed to pass and be accepted into the cell 120.

Figure 11:
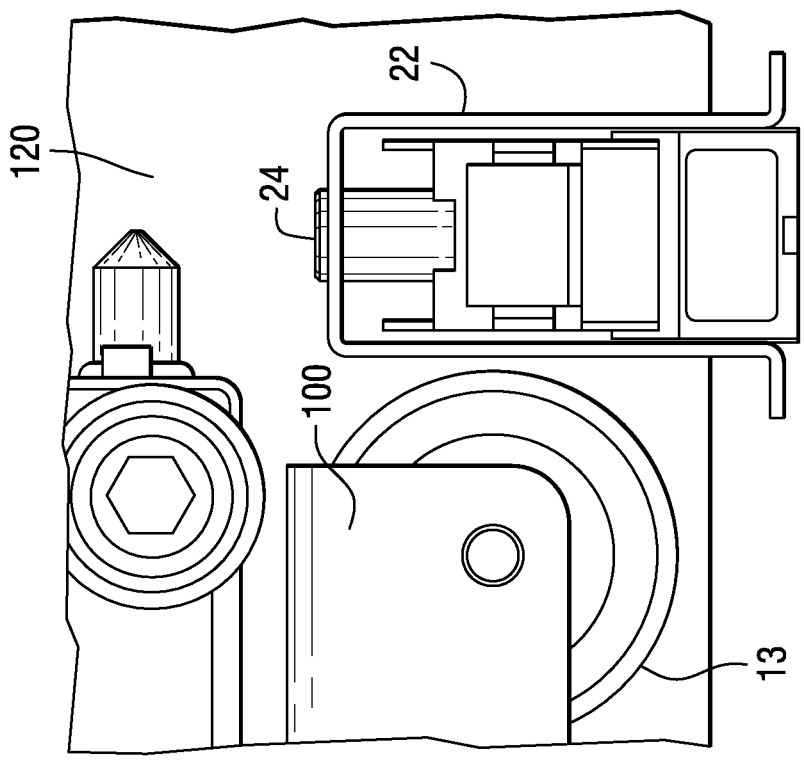
FIG. 11 is a detailed view showing the single cell pin refracted, in accordance with certain embodiments of the disclosed concept.

FIG. 11 is a detailed view of the single code pin 24 which is in a refracted, e.g., open position, and the circuit breaker 100 is allowed to pass and be accepted into the cell 120.

Figure 12:
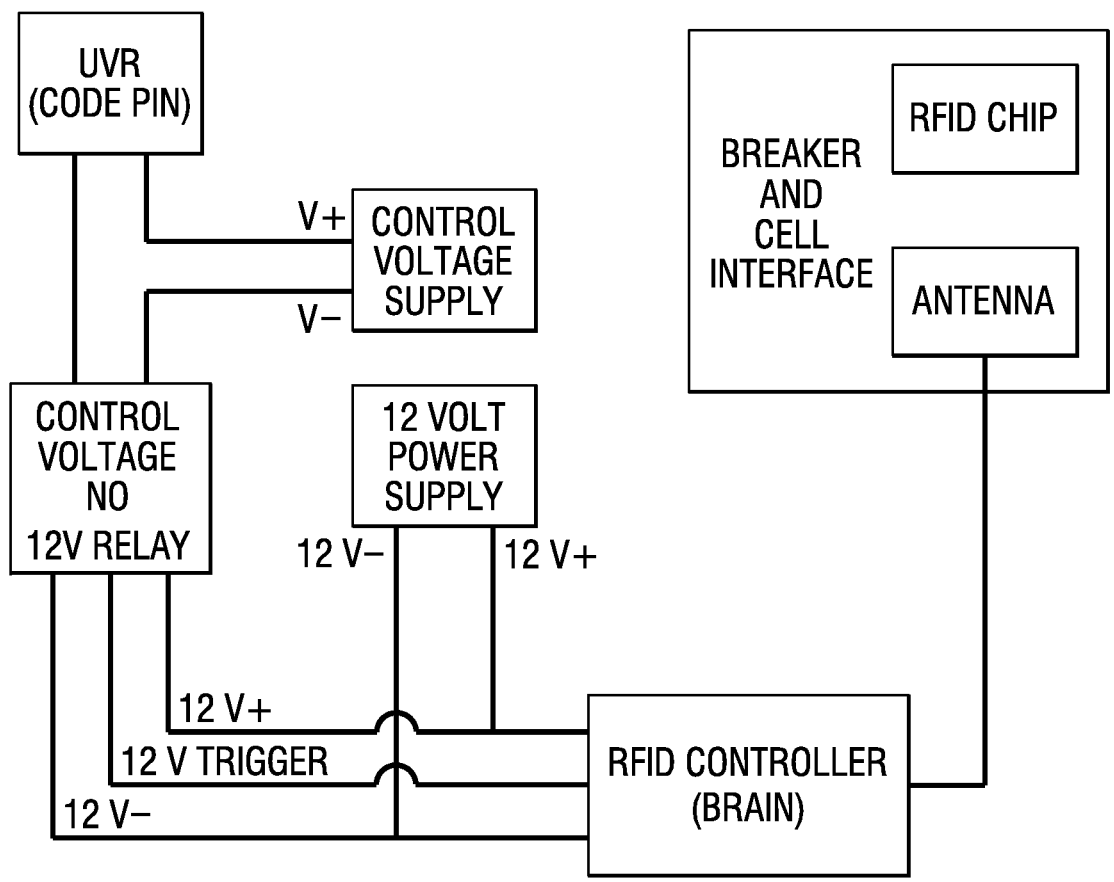
FIG. 12 is a hardware block diagram which shows a RFID interlock system, in accordance with certain embodiments of the disclosed concept.

FIG. 12 is a hardware block diagram showing a RFID interlock in accordance with certain embodiments of the disclosed concept. The RFID interlock includes the RFID tag 18 (shown in FIG. 6) and the antenna (shown in FIG. 7). As previously described herein, the antenna receives the identity code from the RFID tag 18 and delivers the information to the RFID CPU (shown in FIG. 7) for evaluation and comparison with the identity code of the cell 120 (shown in FIG. 6). If the RFID CPU determines an "acceptable" condition, a power supply provides power to the UVR 22 (shown in FIG. 6) to close the circuit between the control voltage supply and the UVR 22 which moves the code pin 24 (shown in FIG. 6) to a retracted position. When the code pin 24 is in the retracted position, the circuit breaker 100 is allowed to pass or enter the cell 120. Alternatively, if the RFID CPU determines an "unacceptable" condition, the circuit between the control voltage supply and the UVR 22 does not close, e.g., is open, and the code pin 24 remains stationary in a non-retracted position. When the code pin 24 is in the non-retracted position, the circuit breaker 100 is blocked from passing or entering the cell 120.

The RFID-actuated code interlock of the disclosed concept provides for operation of a single point mechanism to allow or to block a circuit breaker to pass or enter a switchgear compartment. Comparable prior art interlock systems may include an analog system which requires a plurality, e.g., ten or more, points or digits to allow or to block a circuit breaker to pass or enter a switchgear compartment. At least one advantage of the disclosed concept is that it requires considerably less space than comparable known systems.

EXAMPLE

A commercially available kit (Model TR2) containing the following components was obtained and configured as follows.

A 12V power supply was connected to a 110V outlet and set to supply 12V. An Under Voltage Relay (UVR) was used to simulate a pin that remained in an up position or a "Blocking" position in an un-energized state. When voltage was applied across a coil the pin was pulled to the down position or "Allow to Pass" position.

An RFID CPU was connected to the antenna and relay, and to the 12V power supply. One terminal of the UVR was connected to the relay and the other terminal of the UVR was connected to a control voltage supply (110 VAC). The control voltage supply and 12V power supply were switched on to provide power to the system.

An "acceptable" RFID-FOB was brought into proximity of the antenna. At this point, the UVR retracted to the down-position or "Allow to Pass" position. The "acceptable" RFID-FOB was then moved out of proximity of the antenna. At this point, the UVR was reset to the up position or "Blocking" position. The procedure of creating an "acceptable" RFID-FOB and bringing it into proximity of the antenna was repeated ten times with the same result, e.g., "Allow to Pass" position, each time.

An "unacceptable" RFID-FOB was created by deleting one of the RFID fobs from the CPU memory in accordance with manufacturer's procedure. The "unacceptable" RFID-FOB was brought into proximity of the antenna. At this point, the UVR did not move and remained in the up position or "Blocking" position. The procedure of creating an "unacceptable" RFID-FOB and bringing it into proximity of the antenna was repeated ten times with the same result, e.g., "Blocked" position, each time.

While example systems, methods, and the like have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosed concept is not limited to the specific details, the representative apparatus, and illustrative examples shown and described. Thus, this application is intended to embrace alterations, modifications, and variations that fall within the scope of the appended claims.

What is claimed is:

1. A circuit breaker interlock system, comprising:
    a circuit breaker, the circuit breaker having thereon a RFID tag storing first information relating to at least one operational characteristic of the circuit breaker; and
    a cell structured to receive the circuit breaker, the cell including:
        a blocking mechanism structured to be moveable between a blocking condition which prevents insertion of the circuit breaker into the cell and a non-blocking condition which permits insertion of the circuit breaker into the cell; and
        an RFID reader module structured to wirelessly receive the first information from the RFID tag on the circuit breaker and determine whether to move the blocking mechanism from the blocking condition to the non-blocking condition to permit insertion of the circuit breaker into the cell based on the at least one operational characteristic of the circuit breaker.

2. The circuit breaker interlock system of claim 1, wherein the blocking mechanism includes a relay which opens for the blocking condition and closes for the non-blocking condition.

3. The circuit breaker interlock system of claim 1, wherein the blocking mechanism includes a pin mechanism structured to retract for the non-blocking condition to permit the circuit breaker to be inserted into the cell beyond the pin mechanism and the pin mechanism is structured to be un-retracted for the blocking condition to prevent the circuit breaker from being inserted into the cell beyond the pin mechanism.

4. The circuit breaker interlock system of claim 3, wherein the pin mechanism is a single pin.

5. The circuit breaker interlock system of claim 1, wherein the first information is relating to an operational characteristic selected from the group consisting of voltage, continuous current, number of cycles and combinations thereof.

6. The circuit breaker interlock system of claim 1, wherein the RFID reader module is structured to store second information relating to an operational characteristic of the cell.

7. The circuit breaker interlock system of claim 6, wherein the second information is relating to an operational characteristic selected from the group consisting of voltage, continuous current, number of cycles and combinations thereof.

8. The circuit breaker interlock system of claim 6, wherein the RFID reader module is structured to compare the first information relating to the operational characteristic of the circuit breaker with the second information relating to the operational characteristic of the cell and determine whether to move the blocking mechanism from the blocking condition to the non-blocking condition based on the comparison of the first information with the second information.

9. The circuit breaker interlock system of claim 8, wherein the operational characteristic of the circuit breaker and the operational characteristic of the cell are each continuous current.

10. The circuit breaker interlock system of claim 9, wherein the non-blocking condition corresponds to the continuous current of the circuit breaker being greater than or equal to the continuous current of the cell.

11. The circuit breaker interlock system of claim 9, wherein the blocking condition corresponds to the continuous current of the circuit breaker being less than the continuous current of the cell.

12. The circuit breaker interlock system of claim 1, wherein the cell is a switchgear compartment.

13. A method to control inserting a circuit breaker into a cell, comprising:
  obtaining a circuit breaker, the circuit breaker having thereon a RFID tag;
  storing in the RFID tag first information relating to at least one operational characteristic of the circuit breaker;
  obtaining a cell structured to receive the circuit breaker;
  connecting a blocking mechanism to the cell;
  moving the blocking mechanism between a blocking condition to prevent insertion of the circuit breaker into the cell non-blocking condition to permit insertion of the circuit breaker into the cell;
  employing a RFID reader module structured to wirelessly receive the first information from the RFID tag on the circuit breaker;
  receiving the first information from the RFID tag;
  determining if insertion of the circuit breaker into the cell is to be permitted or prevented based on the at least one operational characteristic of the circuit breaker;
  moving the blocking mechanism into a blocking condition if insertion of the circuit breaker into the cell is to be prevented based on the at least one operational characteristic of the circuit breaker; and
  moving the blocking mechanism into a non-blocking condition if insertion of the circuit breaker into the cell is to be permitted based on the at least one operational characteristic of the circuit breaker.

14. The method of claim 13, further comprising:
  comparing the first information relating to the operational characteristic of the circuit breaker with second information relating to an operational characteristic of the cell; and
  determining whether to move the blocking pin mechanism from the blocking condition to the non-blocking condition based on the comparison of the first information with the second information.

* * * * *